UNITED STATES PATENT OFFICE.

ROBERT S. EDWARDS, OF BROOKLINE, MASSACHUSETTS.

PROCESS OF EXTRACTING POTASSIUM SALTS.

1,320,211.  Specification of Letters Patent.  Patented Oct. 28, 1919.

No Drawing.  Application filed September 25, 1918. Serial No. 255,683.

*To all whom it may concern:*

Be it known that I, ROBERT S. EDWARDS, a citizen of the United States, and a resident of Brookline, Massachusetts, have invented certain new and useful Improvements in Processes of Extracting Potassium Salts, of which the following is a specification.

The invention relates to a process of extracting potassium compounds from silicates containing potassium in insoluble form, such as feldspar, leucite and other feldspathic materials.

An object of the invention is to provide a process for the purpose stated which produces a greater percentage of extraction of potassium compounds in water soluble form than prior processes and accomplishes the increased extraction at a relatively lesser cost.

The invention possesses other advantageous features, some of which, with the foregoing, will be set forth at length in the following description, where I shall outline in full, one form of the process of my invention. It is to be understood, however, that the invention expressed in the claims is not limited to the specific process described in the specification.

A feature of this invention consists of the presence of steam in contact with the reacting mass in the retort or kiln, and this steam may be produced within the mass or may be introduced from an external source or both, depending upon conditions of operation. I prefer, however, to produce the steam within the mass, by including in the mixture of materials an ingredient which will liberate steam when heated to high temperatures.

In carrying out the process in accordance with this latter method, the feldspar or other potassium silicate is crushed, preferably to a sufficient fineness so that it will pass an 80 or a 100-mesh screen. The crushed feldspar is mixed with salt (sodium chlorid) in sufficient quantity so that when it is melted it will fill the voids in the charge and completely cover the charge. Sufficient salt should also be used to supply chlorin, when decomposed, in excess of that necessary to combine with all of the potassium present in the silicate and to produce an excess of hydrochloric acid gas. I have found that the amount of salt necessary is approximately 60% by weigth of the feldspar. To this mixture is added a material which when heated gives off steam and for this material I prefer to use a hydrated base such as hydrated lime or hydro-magnesite. I have employed hydrated lime in various proportions ranging from 15% to 40% by weight of the feldspar and find that the best extraction is obtained when between 25% to 40% of the hydrated lime in proportion to the feldspar is used.

The mixture of these ingredients is placed in a kiln or retort and heated to fushion, approximately 2000° Fahrenheit, for a sufficient length of time to accomplish the liberation of the potassium from the feldspar. The combined water in the hydrated lime commences to be given off at approximately 800° Fahrenheit and is immediately converted into superheated steam, in direct and intimate contact with the hot feldspar and sodium chlorid. This steam dissociates and the hydrogen combines with the chlorin in the sodium chlorid, forming hydrochloric acid gas throughout the entire mixture, which greatly aids and facilitates the chemical reaction which results in the replacement of the potassium in the feldspar by the liberated sodium. The chlorin combines with the potassium forming the water soluble potassium chlorid. The excess hydrochloric acid gas which is liberated from the mass in the kiln is drawn off and absorbed in water.

After the mass has been heated for a sufficient time to obtain the replacement of the potassium, approximately 60 minutes, the mass is discharged from the kiln and quenched in water, and the potassium chlorid and remaining sodium chlorid goes into solution. The mixture is then filtered to separate the liquid from the solid particles and the potassium chlorid is recovered from the liquid by fractional crystallization or otherwise.

Instead of employing a hydrated base, so that the steam is produced within the mass, I may employ other ingredients and introduce the steam from an external source. Calcium oxid or calcium carbonate may be employed instead of the hydrated lime, and when either of these is used steam is introduced into the kiln, either as steam or as water, which is vaporized within the kiln. This water may be added separately or may be added to the mixture before it is introduced or as it is introduced, but I have found that the other mixture of ingredients may be ground to a slurry, as in the preparation of raw materials in the wet process of Portland cement manufacture, but I have found that the water added in this manner is driven off at too low a temperature to be of particular advantage and when using calcium oxid or calcium carbonate, I prefer to introduce the steam or water separately into the kiln during the heating of the charge in such a manner that the steam thoroughly permeates the charge. When the hydrated base is used as an ingredient, steam may also be introduced into the kiln. In the succeeding claims, when I mention the decomposition of insoluble potassium bearing silicates in the presence of steam, it is to be understood that I refer to steam which is generated within the mass, or steam which is added from an external source, or both.

Instead of employing sodium chlorid, I may employ sodium sulfate, which results in the extraction of potassium sulfate, which is water soluble, but the percentage of extraction in this process is not as high as when the sodium chlorid is used.

I claim:

1. The process of extracting potassium salts in water soluble form from silicates containing potassium in insoluble form which comprises heating to fusion point of the sodium chlorid a mixture of the silicate and sodium chlorid in excess of the molecular equivalent required for replacement of the potassium contained in the silicate in the presence of intimately associated steam.

2. The process of extracting potassium salts in water soluble form from silicates containing potassium in insoluble form which comprises heating to fusion point of the sodium chlorid a mixture of the silicate, sodium chlorid, and a suitable hydrated base, the sodium chlorid being in excess of the molecular equivalent required for replacement of the potassium contained in the silicate.

3. The process of extracting potassium salts in water soluble form from silicates containing potassium in insoluble form which comprises heating to fusion point of the sodium chlorid a mixture of the silicate and not less than 60% of sodium chlorid in the presence of intimately associated steam.

4. The process of extracting potassium salts in water soluble form from silicates containing potassium in insoluble form which comprises heating to fusion point of the sodium chlorid, a mixture of the silicate, sodium chlorid and a suitable hydrated base, the sodium chlorid being in quantity not less than 60% of the silicate used.

5. The process of extracting potassium salts in water soluble form from silicates containing potassium in insoluble form which comprises heating to fusion point of the sodium chlorid, a mixture of the silicate, not less than 60% of the sodium chlorid and a suitable hydrated base, which will liberate all of its combined moisture only upon reaching a temperature of approximately a thousand degrees F.

In testimony whereof I affix my signature.

ROBERT S. EDWARDS.